US012795256B2

(12) United States Patent
Oguro et al.

(10) Patent No.: US 12,795,256 B2
(45) Date of Patent: Nov. 10, 2026

(54) IMAGE READOUT METHOD FOR IMAGE SENSOR WITH HIGH DYNAMIC RANGE

(71) Applicant: OMNIVISION TECHNOLOGIES, INC., Santa Clara, CA (US)

(72) Inventors: Yusuke Oguro, Tokyo (JP); Yoshikazu Nitta, Tokyo (JP)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 22 days.

(21) Appl. No.: 18/984,876

(22) Filed: Dec. 17, 2024

(65) Prior Publication Data

US 2026/0172704 A1 Jun. 18, 2026

(51) Int. Cl.

| | |
|---|---|
| ***H04N 25/59*** | (2023.01) |
| ***H04N 25/771*** | (2023.01) |
| ***H04N 25/778*** | (2023.01) |
| ***H04N 25/779*** | (2023.01) |

(52) U.S. Cl.
CPC ........... *H04N 25/59* (2023.01); *H04N 25/771* (2023.01); *H04N 25/778* (2023.01); *H04N 25/779* (2023.01)

(58) Field of Classification Search
CPC .... H04N 25/59; H04N 25/771; H04N 25/778; H04N 25/779
See application file for complete search history.

(56) References Cited

U.S. PATENT DOCUMENTS

2020/0396399 A1* 12/2020 Tsai ..................... H04N 25/533
2021/0248758 A1 8/2021 Li et al.

* cited by examiner

*Primary Examiner* — Nicholas G Giles
(74) *Attorney, Agent, or Firm* — JC ONE WORLD

(57) ABSTRACT

An image readout method includes sequentially reading out charges generated by multiple photodiodes which are coupled to a floating diffusion portion; storing the read out charges in a lateral overflow integration capacitor (LOFIC) and a floating diffusion capacitor which are coupled to the floating diffusion portion; and reading out the charges stored in the LOFIC and the floating diffusion capacitor, and resetting the LOFIC and the floating diffusion capacitor.

10 Claims, 7 Drawing Sheets

IMAGE READOUT METHOD FOR IMAGE SENSOR WITH HIGH DYNAMIC RANGE

BACKGROUND

Technical Field

The disclosure relates to an image readout method, and particularly relates to an image readout method for an image sensor with high dynamic range (HDR).

Description of Related Art

Image sensors are common devices that are widely used in digital still cameras, mobile phones, security cameras, etc. for medical, automotive, and other applications. Many of these applications require image sensors with HDR. An HDR image can show both the dark and bright parts with recognizable details. However, current HDR technology may fall short in faithfully reproducing the actual scene that includes both dark and bright parts.

In some cases, for example, when zooming in a region of interest (ROI) in an HDR scene, the details of the image may be lost due to overexposure. Furthermore, when the subject in the scene waves an object in a backlight environment, motion artifacts may occur.

SUMMARY

The disclosure provides an image readout method for an image sensor with HDR, which can clearly show details of ROI in an image when zooming in the image.

The image readout method according to an embodiment of the disclosure includes: sequentially reading out charges generated by multiple photodiodes which are coupled to a floating diffusion portion; storing the read out charges in a lateral overflow integration capacitor (LOFIC) and a floating diffusion capacitor which are coupled to the floating diffusion portion; and reading out the charges stored in the LOFIC and the floating diffusion capacitor, and resetting the LOFIC and the floating diffusion capacitor.

To make the aforementioned features and advantages of the disclosure more comprehensible, exemplary embodiments are described in detail hereinafter in conjunction with the accompanying figures.

DESCRIPTION OF THE EMBODIMENTS

Exemplary embodiments are provided hereinafter to describe the disclosure in detail, but the disclosure is not limited to the provided embodiments. Besides, the provided embodiments may be combined in various ways as appropriate. The terms "coupling/coupled" or "connecting/connected" used in this specification (including the claims) may refer to any direct or indirect connection means. For example, "the first device is coupled to the second device" should be interpreted as "the first device is directly connected to the second device" or "the first device is indirectly connected to the second device through other devices or by other connection means". In addition, the term "signal" may refer to current, voltage, charge, temperature, data, electromagnetic wave, or any one or more signals.

Figure 1:
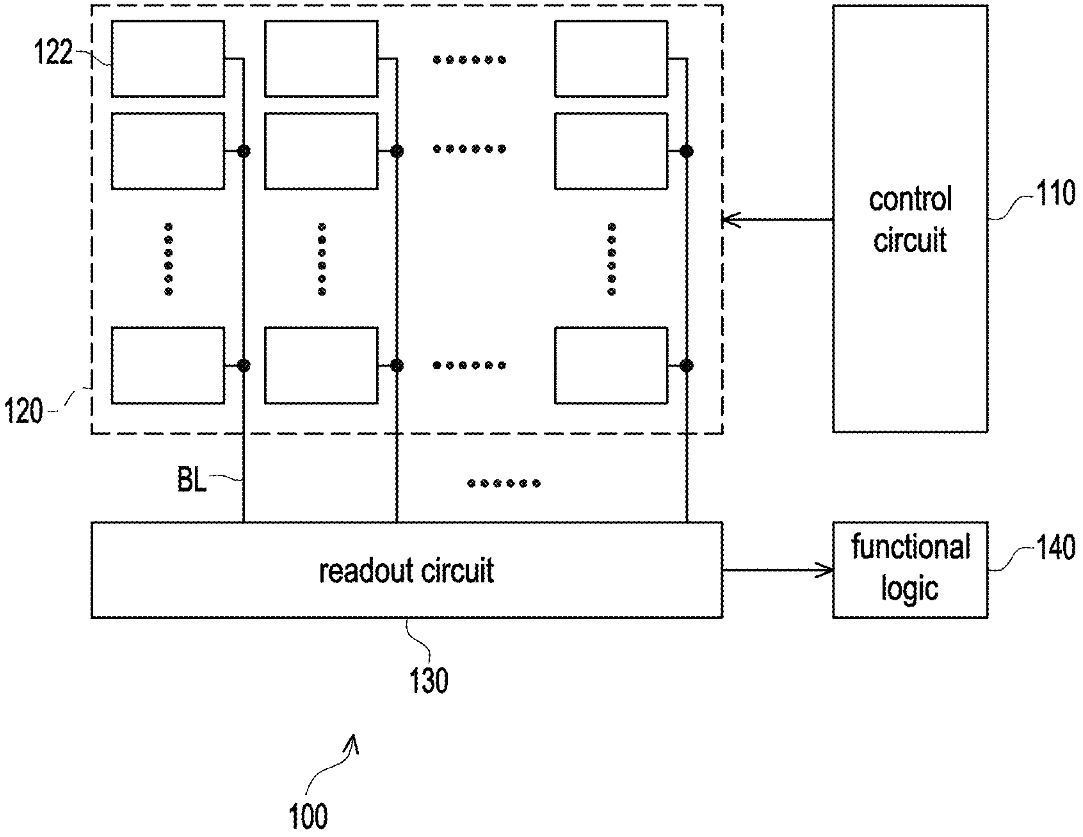
FIG. 1 is a schematic diagram of an imaging system according to an embodiment of the disclosure.

FIG. 1 is a schematic diagram of an imaging system according to an embodiment of the disclosure. Referring to FIG. 1, the imaging system 100 includes a control circuit 110, a pixel array 120, a readout circuit 130, and a functional logic 140.

The pixel array 120 includes multiple pixel units 122 arranged in an array. The pixel unit 122 is configured to be exposed to obtain image data or image charges. The readout circuit 130 reads out the image data through bit lines BL and transmits the image data to the functional logic 140. The functional logic 140 is configured to store the image data or perform an image processing operation on the image data. The control circuit 110 is configured to output various control signals to control the overall operation of the imaging system 100.

In one embodiment, the readout circuit 130 includes a signal amplifier, an analog-to-digital converter (ADC), and a data transmission circuit. In one embodiment, the functional logic 140 includes a digital processor. In one embodiment, the control circuit 110 and the functional logic 140 are integrated into a single functional block.

Figure 2:
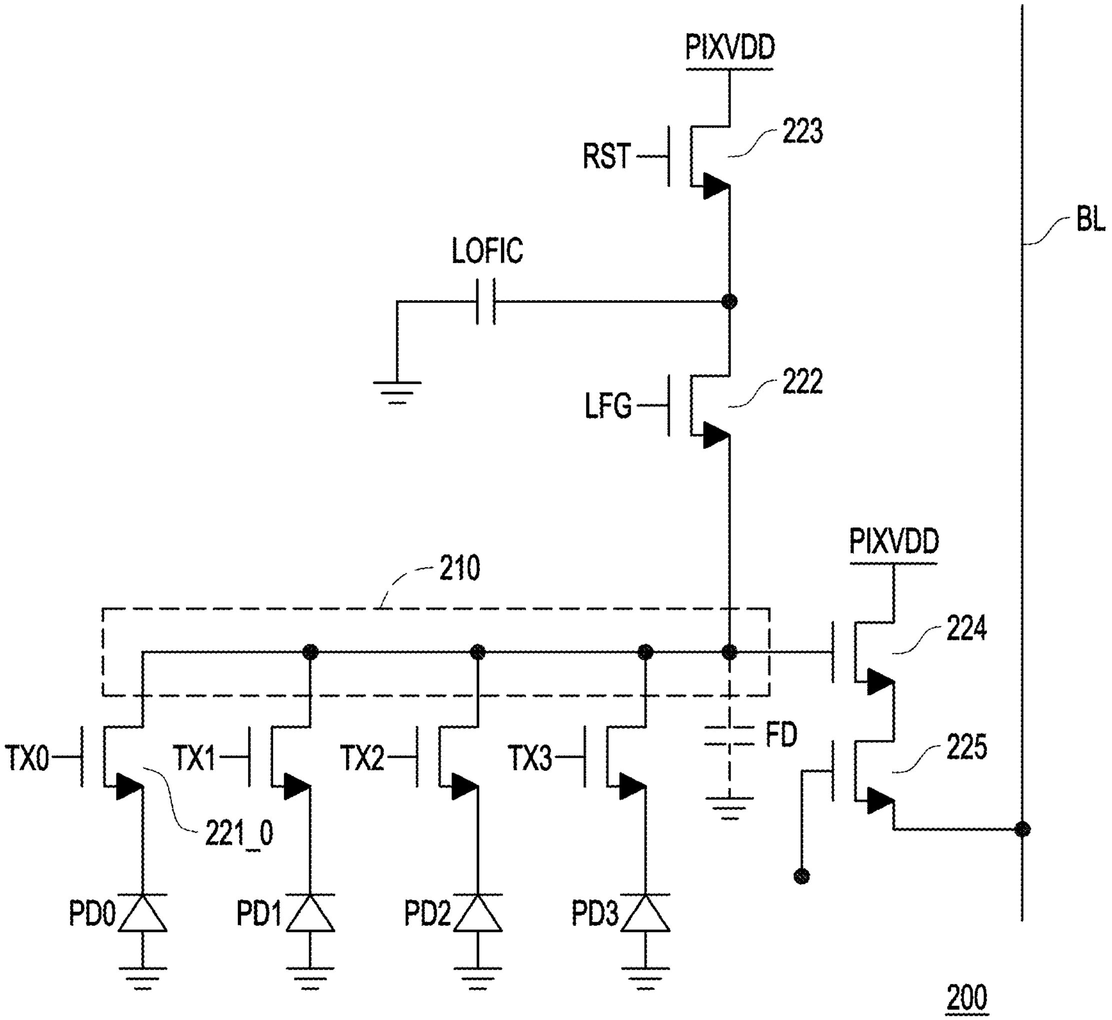
FIG. 2 is a circuit structure diagram of a pixel unit according to an embodiment of the disclosure.
Figure 3:
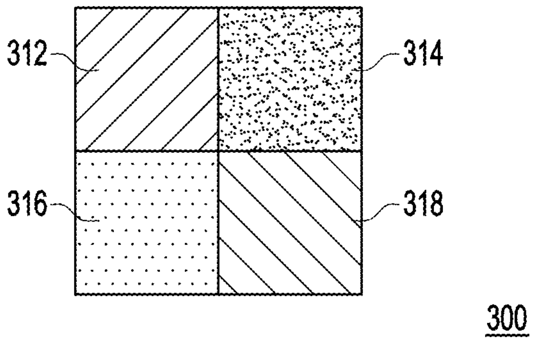
FIG. 3 is a schematic diagram of the arrangement of a pixel array according to an embodiment of the disclosure.

FIG. 2 is a circuit structure diagram of a pixel unit according to an embodiment of the disclosure. FIG. 3 is a schematic diagram of the arrangement of a pixel array according to an embodiment of the disclosure. Referring to FIG. 2 and FIG. 3, the pixel unit 200 includes a lateral overflow integration capacitor (LOFIC) and multiple photodiodes PD0, PD1, PD2, and PD3. The pixel unit 200 further includes a floating diffusion portion 210. The floating diffusion portion 210 is coupled to the photodiodes PD0, PD1, PD2, and PD3 to receive charges generated due to incident light.

The pixel unit 200 is, for example, a pixel unit of an HDR complementary metal-oxide-semiconductor (CMOS) image sensor. The HDR CMOS image sensor includes a capacitor LOFIC for additionally storing charges generated by the photodiodes.

The capacitor FD is a floating diffusion capacitor corresponding to a floating diffusion portion 210, and the capacitor LOFIC may provide additional storage for charges generated by the photodiodes PD0, PD1, PD2, and PD3. A source follower 224 is an amplifier transistor, with a gate terminal coupled to the floating diffusion portion 210 to generate an image data signal in response to charges in the floating diffusion portion 210. A row select transistor 225 is coupled to the source follower 224 to output the image data signal to the bit lines BL.

In FIG. 3, the pixel array 300 includes multiple pixels 312, 314, 316, and 318. Each of the pixels 312, 314, 316, and 318 corresponds to one photodiode. In this embodiment, the pixels 312, 314, 316, and 318 are, for instance, a green pixel, a red pixel, a blue pixel, and a green pixel, respectively. Nevertheless, the disclosure is not intended to limit the colors of the pixels and how the pixels are arranged.

Figure 4:
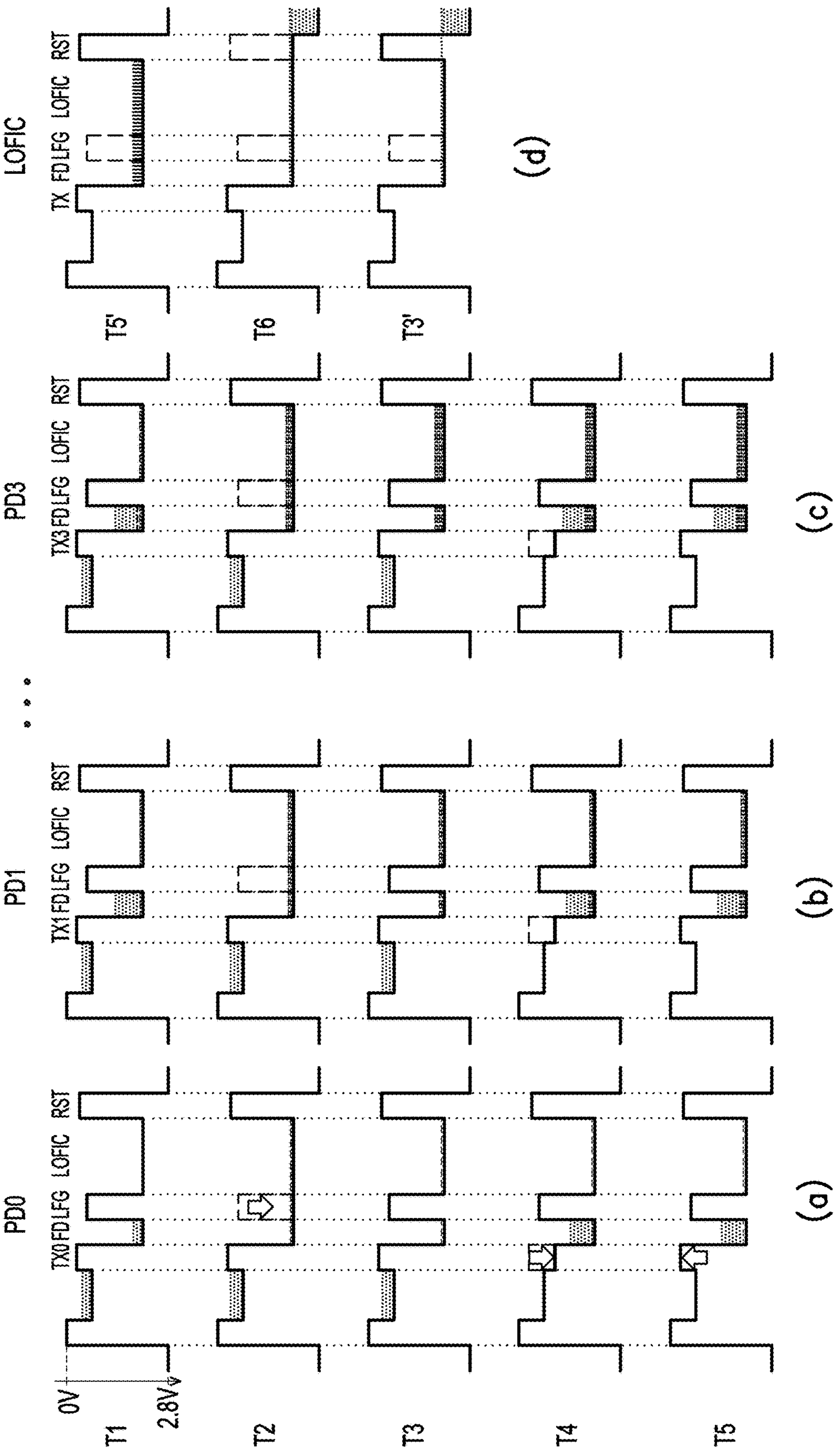
FIG. 4 is a timing diagram of an image readout method according to an embodiment of the disclosure.

FIG. 4 is a timing diagram of an image readout method according to an embodiment of the disclosure. The image readout method is at least applicable to the high conversion gain (HCG) pixel unit 200 as shown in FIG. 2, and may be executed by the control circuit 110, the readout circuit 130, and/or the functional logic 140 of FIG. 1. The following sequentially describes the image readout method in (a), (b), (c), and (d) of FIG. 4.

Referring to FIG. 2 and FIG. 4, (a), (b), and (c) of FIG. 4 respectively show how the image readout method sequentially reads out the charges generated by the photodiodes PD0, PD1, PD2, and PD3 in response to incident light, and stores the charges in the capacitor FD and the capacitor LOFIC. To simplify the illustration, FIG. 4 does not show the readout operation for the photodiode PD2. (d) of FIG. 4 shows how the image readout method finally reads out the charges stored in the capacitor FD and the capacitor LOFIC, which includes an autozero operation.

In (a) of FIG. 4, the readout operation for the photodiode PD0 includes an integration period T1, a reset period T2, a first readout period T3, a charge transfer period T4, and a second readout period T5. In the figure, TX0, LFG, and RST respectively represent control signals for controlling a transfer transistor 221_0, a switch transistor 222, and a reset transistor 223. A control signal at a low level (for example, 0 volts) turns off the transistor. A control signal at a high level (for example, 2.8 volts) turns on the transistor to transmit a signal. Nevertheless, the voltage values mentioned above are not intended to limit the disclosure. In the figure, FD and LOFIC respectively represent the capacities of the capacitor FD and the capacitor LOFIC.

During the integration period T1, the photodiode PD0 is exposed to sense incident light and generate charges, and some charges may overflow to the capacitor FD and be stored therein. During this period, the switch transistor 222 is turned off. Furthermore, before integration, the photodiode PD0 may be preset through the transfer transistor 221_0, the switch transistor 222 and the reset transistor 223.

During the reset period T2 (for example, floating diffusion reset period), the control signal LFG rises to a higher level, which turns on the switch transistor 222 to reset the floating diffusion portion 210. At this time, the charges stored in the capacitor FD may be evenly distributed and stored in the capacitor FD and the capacitor LOFIC. During this period, the control signal RST remains at a low level to turn off the reset transistor 223, so as to prevent the capacitor FD and the capacitor LOFIC from being affected by the system voltage PIXVDD.

During the first readout period T3 (for example, reset readout period), the control signal LFG returns to a lower level to turn off the switch transistor 222. At this time, the increased charges of the capacitor FD and the capacitor LOFIC may be considered as the charges generated due to noise or the charges overflowed through the channel below the transfer gate.

During the charge transfer period T4, the control signal TX0 rises to a higher level to turn on the transfer transistor 221_0. Therefore, the charges generated by the photodiode PD0 in response to incident light during the integration period T1 are transferred to the capacitor FD.

During the second readout period T5 (for example, signal readout period), the control signal TX0 returns to a lower level to turn off the transfer transistor 221_0. At this time, the charges generated by the photodiode PD0 in response to incident light during the integration period T1 may be stored in the capacitor FD.

Therefore, the charges stored in the capacitor FD and the capacitor LOFIC through the above readout operation of the photodiode PD0 include the charges generated by the photodiode PD0 in response to incident light and the charges generated due to noise. After subtracting the signal of the first readout period T3 from the signal of the second readout period T5 at the readout circuit 130, the signal from the charges generated by the photodiode PD0 are detected. Such a subtraction to delete the background noise from the measured signal is an action called correlated double sampling (CDS), commonly used in image sensing.

The readout operations for the photodiodes PD1, PD2, and PD3 are similar to the readout operation for the photodiode PD0. By repeating the readout operation shown in (a) of FIG. 4, the charges generated by the photodiodes PD1, PD2, and PD3 in response to incident light and the charges generated due to noise can be read out, as shown in (b) and (c) of FIG. 4. The charges stored in the capacitor FD during the readout period T1 of the photodiode PD1 include the charges that overflow due to exposure of the photodiode PD1 and the charges transferred from the photodiode PD0 to the capacitor FD.

The readout operation for the photodiode PD2 is not shown in FIG. 4, but may be carried out similarly. Furthermore, when performing the readout operations for the photodiodes PD0, PD1, PD2, and PD3, the reset transistor 223 remains off.

On the other hand, in (c) of FIG. 4, the charges stored in the capacitor FD and the capacitor LOFIC during the second readout period T5 include the charges accumulated by the photodiodes PD0, PD1, PD2, and PD3 in response to incident light and the charges accumulated due to noise.

Next, in (d) of FIG. 4, the readout operation of the capacitor LOFIC generally includes a first readout period T5', a reset period T6, and a second readout period T3'.

During the first readout period T5', the control signal LFG rises to a higher level, which turns on the switch transistor 222 to mix the charges stored in the capacitor FD and the capacitor LOFIC. During this period, the mixed charges are read out by the readout circuit 130, and the autozero operation is performed.

During the reset period T6 (for example, LOFIC reset period), the control signals LFG and RST rise to higher levels, which simultaneously turns on the switch transistor 222 and the reset transistor 223 to reset the capacitor FD and the capacitor LOFIC.

During the second readout period T3', the control signal LFG remains at a higher level, while the control signal RST returns to a lower level. At this time, the switch transistor 222 is turned on and the reset transistor 223 is turned off to generate charges that are generated due to noise. After subtracting the signal of the second readout period T3' from the signal of the first readout period T5' at the readout circuit 130, the combined/binned signals from the photodiodes PD0, PD1, PD2 and PD3 and from the overflowed charges by four photodiodes are detected by means of the CDS.

Figure 5:
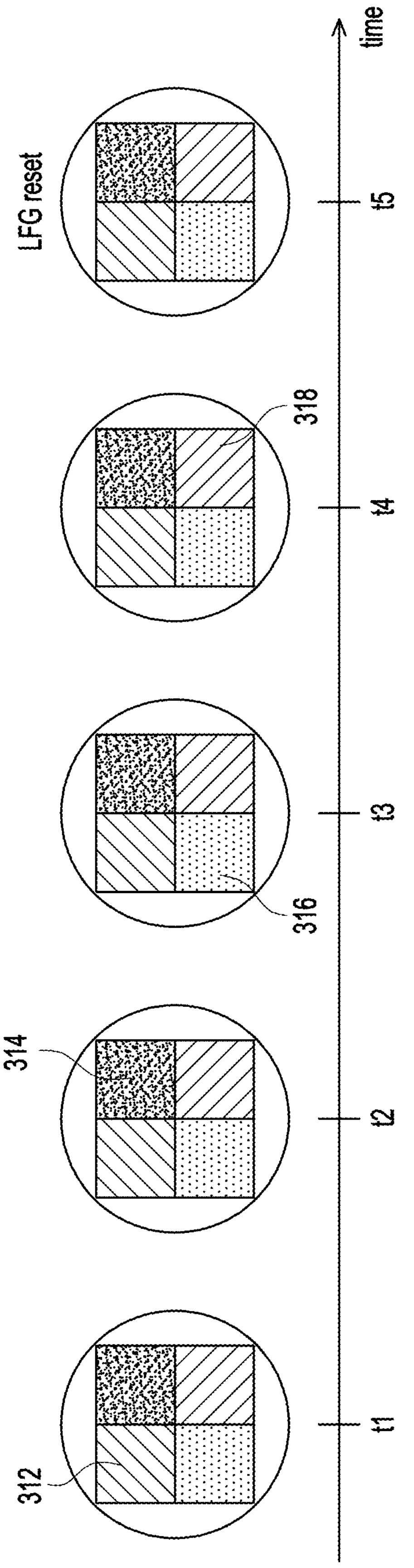
FIG. 5 is a schematic diagram of an image readout method according to another embodiment of the disclosure.

FIG. 5 is a schematic diagram of an image readout method according to another embodiment of the disclosure. The image readout method in FIG. 5 may, for example, be applied to the pixel array 300 in FIG. 3. FIG. 5 shows the readout sequence of pixels. At time points t1, t2, t3, and t4, the charges of pixels 312, 314, 316, and 318 are sequentially read out. At time point t5, the charges stored and accumulated in the capacitor LOFIC are read out, and the capacitor LOFIC is reset. Therefore, compared to related arts, the ADC in the readout circuit 130 only performs analog-to-digital conversion operations when data is read out at time points t1, t2, t3, t4, and t5, which achieves power saving.

Figure 6:
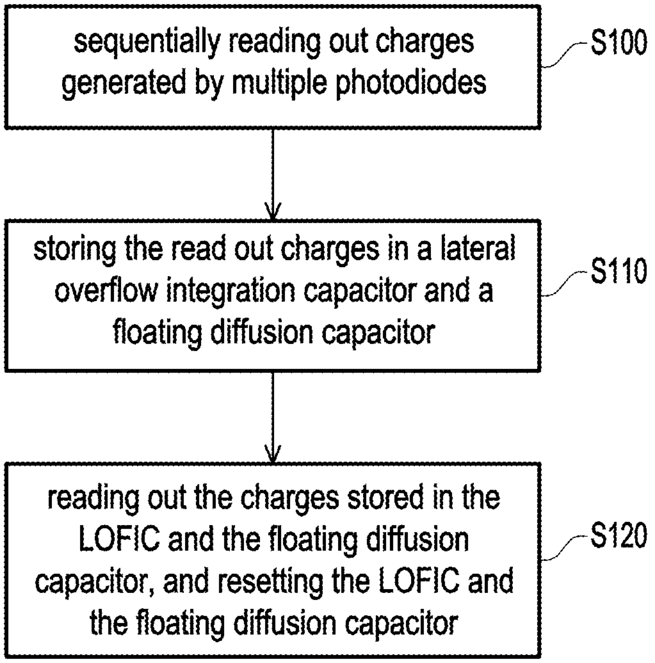
FIG. 6 is a flowchart of an image readout method according to an embodiment of the disclosure.

FIG. 6 is a flowchart of an image readout method according to an embodiment of the disclosure. The image readout method in FIG. 6 may at least be applied to the imaging system 100 in FIG. 1. In step S100, the readout circuit 130 sequentially reads out charges generated by multiple photodiodes PD0, PD1, PD2, and PD3. The photodiodes PD0, PD1, PD2, and PD3 are coupled to the floating diffusion portion 210. In step S110, the readout circuit 130 stores the read out charges in the capacitor LOFIC and the capacitor FD. The capacitor LOFIC and the capacitor FD are coupled to the floating diffusion portion 210. In step S120, the readout circuit 130 reads out the charges stored in the capacitor LOFIC and the capacitor FD, and resets the capacitor LOFIC and the capacitor FD.

The image readout method described in this embodiment of the disclosure is sufficiently taught, suggested, and embodied in the embodiments illustrated in FIG. 1 to FIG. 5, and therefore no further description is provided herein.

Figure 7:
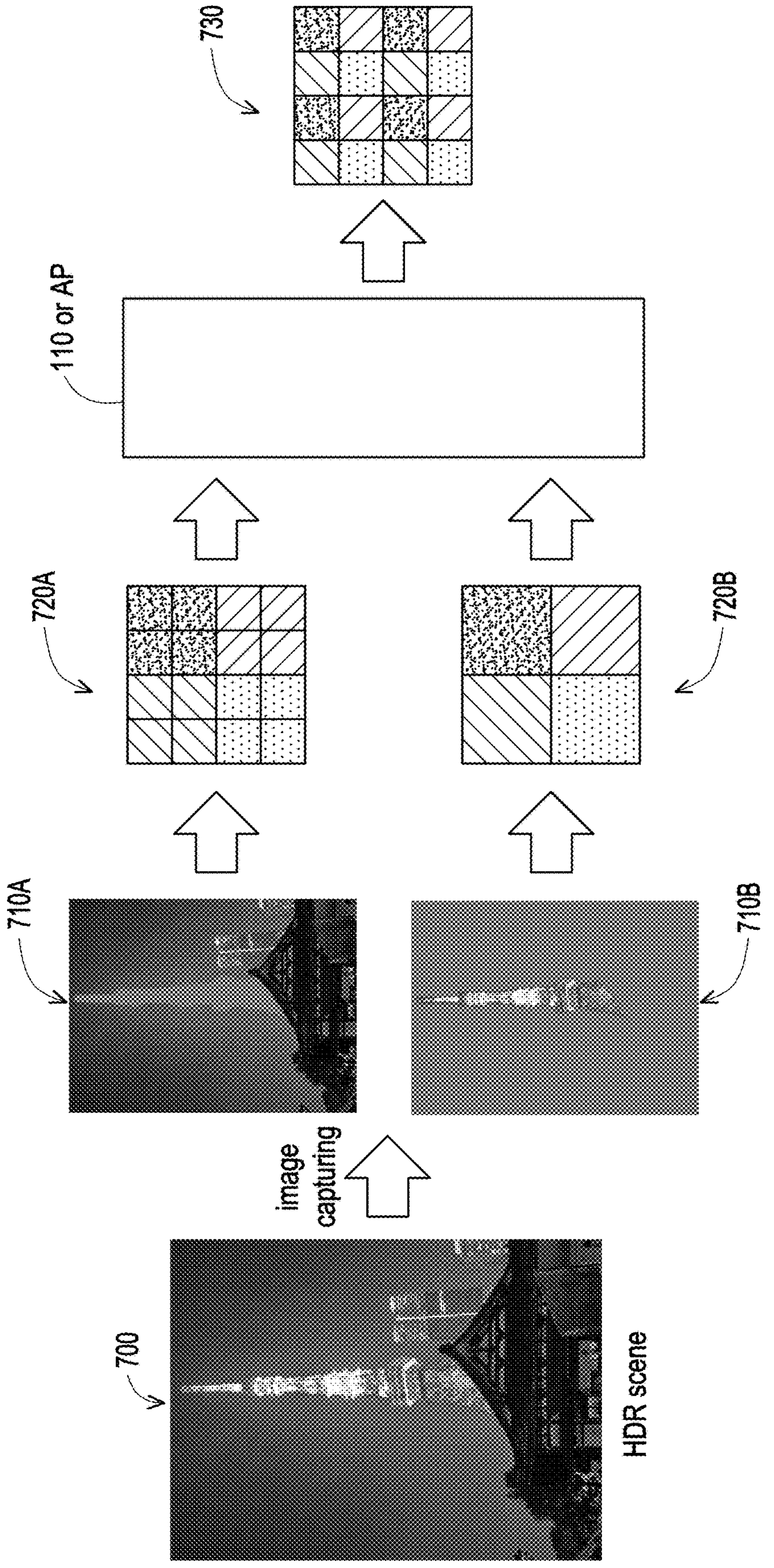
FIG. 7 shows an embodiment of capturing an HDR scene using the image readout method of the disclosure.

FIG. 7 shows an embodiment of capturing an HDR scene using the image readout method of the disclosure. The imaging system 100 may be configured to capture an image of the HDR scene 700. The image 710A is an image captured by the imaging system 100 using high conversion gain (HCG), low conversion gain (LCG), dual conversion gain (DCG), or dual analog gain (DAG) technology. The image 710B is an image captured by the imaging system 100 using the image readout method of FIG. 4 or FIG. 5. The control circuit 110 or application processor AP may perform remosaic algorithm, up conversion algorithm and/or HDR combination algorithm on the image data 720A and 720B corresponding to the images 710A and 710B to obtain the reproduced HDR image 730.

Figure 8:
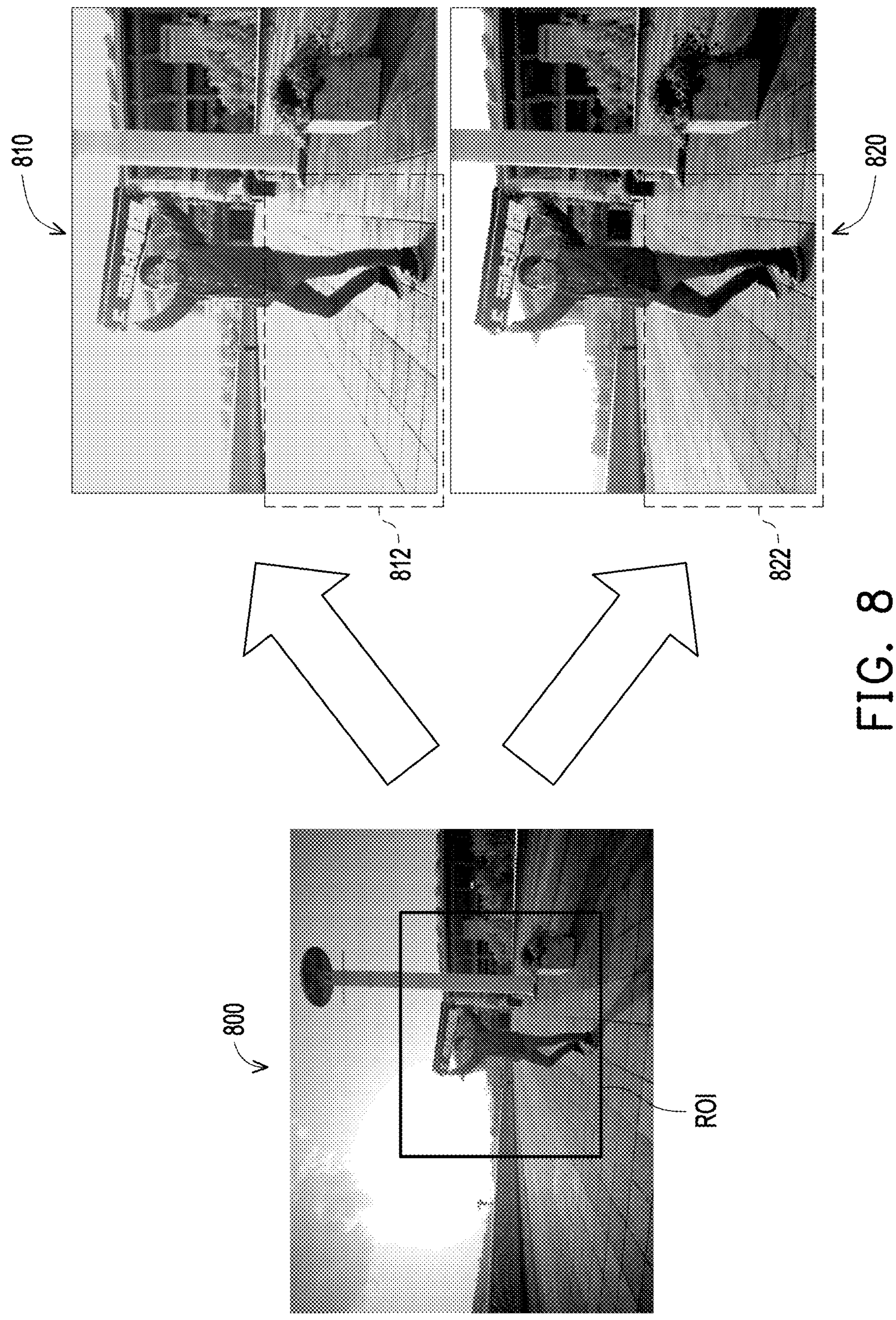
FIG. 8 shows another embodiment of capturing an HDR scene using the image readout method of the disclosure.

FIG. 8 shows another embodiment of capturing an HDR scene using the image readout method of the disclosure. The imaging system 100 may be configured to capture an image of the HDR scene 800. Images 810 and 820 are each a zoomed in image of a region of interest ROI in the HDR scene 800.

The image 810 is an image captured using HCG, LCG, DCG, or DAG technology, but without applying the image readout method of the disclosure. It can be seen from the image 810 that even after zooming in, the details of the region 812 are not clearly shown in the image due to overexposure.

On the other hand, the image 820 is an image captured using HCG, LCG, DCG, or DAG technology, with the image readout method of the disclosure applied. It can be seen from the image 820 that even after zooming in, the details of the region 822 are clearly shown in the image. Furthermore, when the subject in the scene waves a flag in a backlight environment, there is no motion artifact.

To sum up, in the embodiments of the disclosure, the image readout method is applicable to an image sensor with HDR, and can clearly show details of a region of interest in an image when zooming in the image. Furthermore, the image readout method prevents motion artifacts in the image when the subject in the scene waves an object in a backlight environment.

Although the disclosure has been described with reference to the foregoing embodiments, the embodiments are not intended to limit the disclosure. Any person having ordinary skill in the art may make changes and modifications without departing from the spirit and scope of the disclosure. Therefore, the scope of the disclosure will be defined by the appended claims.

What is claimed is:

1. An image readout method, comprising:

sequentially reading out charges generated by a plurality of photodiodes which are coupled to a floating diffusion portion, wherein the plurality of photodiodes comprises a first photodiode and a second photodiode;

storing the read out charges in a lateral overflow integration capacitor (LOFIC) and a floating diffusion capacitor which are coupled to the floating diffusion portion, wherein the charges stored in the floating diffusion capacitor comprise charges that overflow due to an exposure of the second photodiode and charges transferred from the first photodiode to the floating diffusion capacitor; and reading out the charges stored in the LOFIC and the floating diffusion capacitor, and resetting the LOFIC and the floating diffusion capacitor.

2. The image readout method as claimed in claim 1, wherein the step of reading out the charges stored in the LOFIC and the floating diffusion capacitor, and resetting the LOFIC and the floating diffusion capacitor comprises:

turning on a switch transistor corresponding to the LOFIC to mix the charges stored in the LOFIC and the floating diffusion capacitor.

3. The image readout method as claimed in claim 2, wherein the step of reading out the charges stored in the LOFIC and the floating diffusion capacitor, and resetting the LOFIC and the floating diffusion capacitor comprises:

turning on a reset transistor and the switch transistor corresponding to the LOFIC when resetting the LOFIC and the floating diffusion capacitor.

4. The image readout method as claimed in claim 3, wherein the step of reading out the charges stored in the LOFIC and the floating diffusion capacitor, and resetting the LOFIC and the floating diffusion capacitor comprises:

turning off the reset transistor and turning on the switch transistor when reading out the charges stored in the LOFIC and the floating diffusion capacitor.

5. The image readout method as claimed in claim 1, wherein the step of sequentially reading out the charges generated by the plurality of photodiodes comprises:

reading out charges generated by the first photodiode, and then reading out charges generated by the second photodiode, wherein a reset transistor corresponding to the LOFIC is maintained in an off state.

6. The image readout method as claimed in claim 5, wherein the step of reading out the charges generated by the first photodiode comprises:

exposing the first photodiode and turning off a switch transistor corresponding to the LOFIC, wherein some of charges that overflow to the floating diffusion capacitor due to exposure of the first photodiode are stored in the floating diffusion capacitor.

7. The image readout method as claimed in claim 6, wherein the step of reading out the charges generated by the first photodiode further comprises:

turning on the switch transistor corresponding to the LOFIC to store some of the charges that overflow to the floating diffusion capacitor due to exposure of the first photodiode in the LOFIC and the floating diffusion capacitor.

8. The image readout method as claimed in claim 7, wherein the step of reading out the charges generated by the first photodiode further comprises:

turning on a transfer transistor corresponding to the first photodiode to transfer and store the charges generated by the first photodiode in the floating diffusion capacitor.

9. The image readout method as claimed in claim 5, wherein the step of reading out the charges generated by the second photodiode comprises:

exposing the second photodiode and turning off a switch transistor corresponding to the LOFIC.

10. The image readout method as claimed in claim 1, wherein the plurality of photodiodes correspond to a green pixel, a red pixel, a blue pixel, and another green pixel, respectively.

* * * * *